(12) United States Patent
Lagnado et al.

(10) Patent No.: US 12,511,130 B2
(45) Date of Patent: Dec. 30, 2025

(54) TRACKING DEVICE USER ACCOUNT INFORMATION

(71) Applicant: Hewlett-Packard Development Company, L.P., Spring, TX (US)

(72) Inventors: Isaac Lagnado, Spring, TX (US); Christopher Charles Mohrman, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 395 days.

(21) Appl. No.: 18/001,454

(22) PCT Filed: Jul. 17, 2020

(86) PCT No.: PCT/US2020/042624
§ 371 (c)(1),
(2) Date: Dec. 9, 2022

(87) PCT Pub. No.: WO2022/015331
PCT Pub. Date: Jan. 20, 2022

(65) Prior Publication Data
US 2023/0229454 A1    Jul. 20, 2023

(51) Int. Cl.
*G06F 9/4401* (2018.01)
*H04W 4/029* (2018.01)

(52) U.S. Cl.
CPC ........... *G06F 9/4411* (2013.01); *H04W 4/029* (2018.02)

(58) Field of Classification Search
CPC .............................. G06F 9/4411; H04W 4/029
See application file for complete search history.

(56) References Cited

U.S. PATENT DOCUMENTS

| | | | | |
|---|---|---|---|---|
| 10,012,508 B2* | 7/2018 | Beaumont | ............ | G01C 21/206 |
| 10,178,530 B2* | 1/2019 | Forood | .................... | H04W 4/38 |
| 2006/0192987 A1* | 8/2006 | Wu | ........................ | G06F 9/4406 |
| | | | | 358/1.15 |
| 2012/0313756 A1* | 12/2012 | Page | .................. | G06K 19/0723 |
| | | | | 340/8.1 |
| 2014/0181500 A1* | 6/2014 | Mann | .................... | G06F 9/4416 |
| | | | | 713/2 |
| 2015/0046980 A1* | 2/2015 | Gordon | ................... | H04L 63/10 |
| | | | | 726/3 |
| 2015/0302319 A1* | 10/2015 | Elder | ..................... | G06Q 50/06 |
| | | | | 700/291 |
| 2015/0347114 A1* | 12/2015 | Yoon | ................... | H04L 12/2832 |
| | | | | 717/176 |
| 2016/0165409 A1* | 6/2016 | Bulut | ...................... | H04W 4/06 |
| | | | | 715/734 |
| 2016/0381030 A1* | 12/2016 | Chillappa | ............... | H04W 4/38 |
| | | | | 726/11 |
| 2017/0164416 A1* | 6/2017 | Yeddala | ............. | H04W 36/302 |
| 2017/0289943 A1* | 10/2017 | Zhao | ...................... | H04W 4/08 |
| 2018/0191782 A1* | 7/2018 | Djordjevic | .......... | H04L 63/0853 |

(Continued)

*Primary Examiner* — Yuwen Pan
*Assistant Examiner* — Swati Jain
(74) *Attorney, Agent, or Firm* — Quarles & Brady LLP

(57) ABSTRACT

Examples of host devices are described herein. In some examples, a host device may include a tracking device to receive user account information. In some examples, the tracking device may receive user account information wirelessly. In some examples, the host device includes a basic input/output system (BIOS) to store the user account information delivered from the tracking device.

20 Claims, 4 Drawing Sheets

(56) References Cited

U.S. PATENT DOCUMENTS

2019/0259465 A1\* 8/2019 Subramanian ......... G11C 29/38
2019/0334918 A1\* 10/2019 AbiEzzi .............. H04L 63/0281
2020/0236245 A1\* 7/2020 Yamada ............. H04N 1/00962

\* cited by examiner

TRACKING DEVICE USER ACCOUNT INFORMATION

BACKGROUND

Electronic technology has advanced to become virtually ubiquitous in society and has been used for many activities in society. For example, electronic devices are used to perform a variety of tasks, including work activities, communication, research, and entertainment. Different varieties of electronic circuitry may be utilized to provide different varieties of electronic technology.

DETAILED DESCRIPTION

Figure 1:
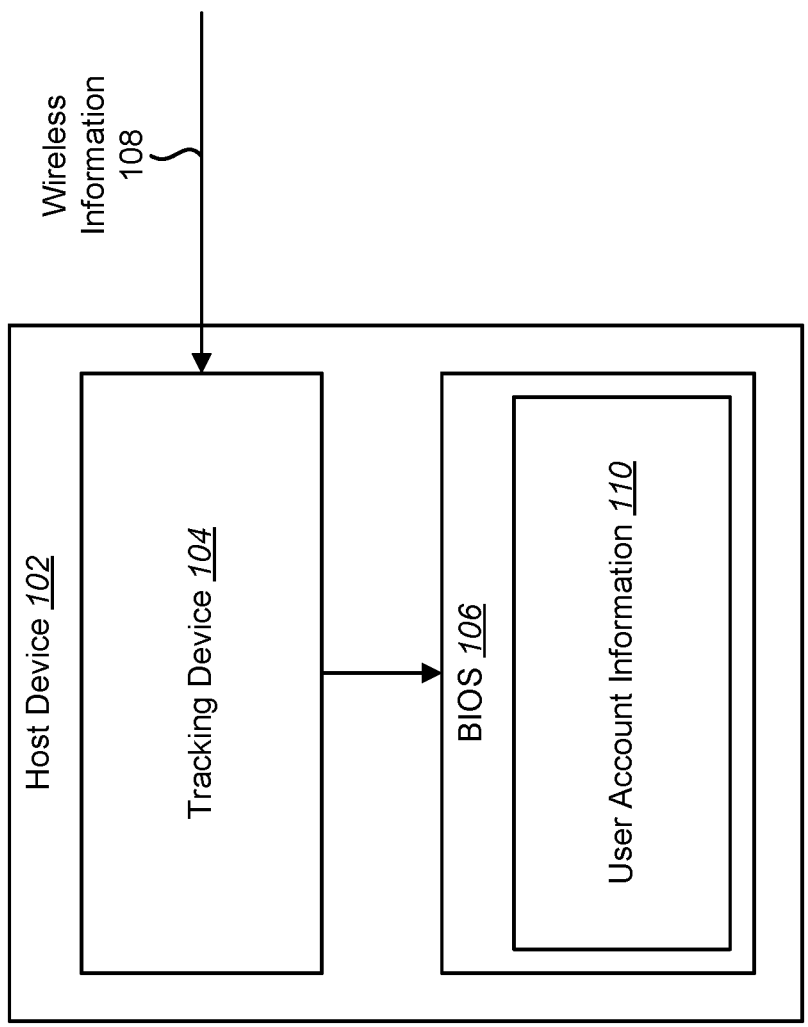
FIG. 1 is a block diagram of an example of a host device that may be utilized for provisioning using a basic input/output system (BIOS)

An electronic device may be a device that includes electronic circuitry. For instance, an electronic device may include integrated circuitry (e.g., transistors, digital logic, semiconductor technology, etc.). Examples of electronic devices include computing devices, laptop computers, desktop computers, smartphones, tablet devices, wireless communication devices, game consoles, smart appliances, vehicles with electronic components, aircraft, drones, robots, smart appliances, tracking devices, etc.

A tracking device may be a device to provide location and/or tracking functionality. For example, a tracking device may utilize wireless signaling to indicate a current and/or past location of the tracking device. In some examples, a tracking device may transmit a signal (e.g., beacon, advertisement signal, etc.) that may indicate a location of the tracking device and/or may indicate a proximity of the tracking device to a receiving device.

In some examples of the electronic devices described herein, a tracking device and/or other wireless communication device (e.g., Internet of Things (IoT) device) may be included in and/or integrated into a host device. A host device may be a device that includes an electronic device or devices (e.g., a tracking device). The tracking device and/or other wireless communication device may be utilized to track, locate, and/or send a signal from the host device.

As used herein, a basic input/output system (BIOS) refers to hardware or hardware and instructions to initialize, control, and/or operate a computing device prior to execution of an operating system (OS) of the computing device. Instructions included within a BIOS may be software, firmware, microcode, and/or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, and/or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

Some examples of the techniques described herein may enable communication with an electronic device (e.g., computing device, host device, etc.) via a BIOS. For instance, a tracking device and/or integrated wireless communication device in an electronic device may be utilized to receive information that may be delivered to the BIOS. In some examples, the received information may be utilized for performing an operation or operations on the host device. For instance, some of the techniques described herein may be utilized for electronic device communication, provisioning, and/or management via a BIOS. Provisioning may be a procedure for electronic device setup, registration, activation, and/or management. For example, provisioning may be performed to setup, register, activate, and/or manage a tracking device and/or integrated wireless communication device in a host device.

In some approaches, tracking device and/or integrated wireless communication device provisioning may include several procedures such as device activation and/or user account registration. Efficient provisioning may be a challenge in some scenarios. For example, some approaches to provisioning may lack scalability for some scenarios (e.g., large companies) and/or may be performed at a consumer level.

Some examples of the techniques described herein may utilize a BIOS for device (e.g., tracking device, integrated wireless communication device, and/or host device) provisioning. For instance, BIOS-based provisioning may be performed to set up, register, activate, enable, disable, communicate with, and/or manage, etc., a device or devices (e.g., tracking device(s), integrated wireless communication device(s), and/or host device(s)). In some scenarios, remote BIOS-based provisioning may be performed for an information technology decision maker (ITDM). For instance, remote BIOS-based provisioning may allow for scalability in managing a fleet of devices. In some examples, remote BIOS-based provisioning may enable an ITDM to provide fleet account information into a BIOS for use by a host device during an activation procedure. In some examples, end-user interaction in provisioning procedure(s) may be avoided. In some examples, remote BIOS-based provisioning may enable access to device (e.g., tracking device, integrated wireless communication device, and/or host device) status information.

In some examples, BIOS-based provisioning may be performed with an ad-hoc network. An ad-hoc network may be a temporary and/or impromptu network that is formed extemporaneously and/or spontaneously. For instance, an ad-hoc network may be formed between mobile electronic devices (e.g., smartphones, tablet devices, laptop computers, etc.) and/or may vary in location over time. For example, an ad-hoc network may be formed when electronic devices are within a range (e.g., 200 feet, 300 feet, 400 feet, etc.) and communicate with ad-hoc (e.g., extemporaneous, impromptu, etc.) communications. In some examples, an ad-hoc network may be formed between peer devices. An ad-hoc device may be a device that is capable of ad-hoc communication. In some examples, an ad-hoc device may be linked to an ad-hoc network and/or may participate in (e.g., send and/or receive) ad-hoc communications with another electronic device. In some examples, an ad-hoc network may be a transient network, non-stationary network, and/or non-established network.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples in accordance with the description; however, the description is not limited to the examples provided in the drawings.

FIG. 1 is a block diagram of an example of a host device 102 that may be utilized for provisioning using a BIOS 106. Examples of the host device 102 may include laptop computers, tablet devices, game consoles, smartphones, etc. The host device 102 may include a tracking device 104 and a BIOS 106.

The tracking device 104 may be a device that can be tracked with wireless signaling. For example, the tracking device 104 may transmit a beacon or beacons for locating and/or tracking the tracking device 104. Some examples of the tracking device 104 include Bluetooth trackers and/or wireless communications devices that send data (e.g., location data, coordinate data, etc.) for location and/or tracking functionality. In some examples, the host device 102 and/or tracking device 104 may perform one, some, or all of the operations, elements, aspects, etc., described in one, some, or all of FIG. 1-4.

In some examples, the tracking device 104 may be embedded in and/or coupled to the host device 102. As used herein, the term "embedded in" may mean that an element or device may be included in and/or integrated into another element or device. As used herein, the term "coupled to" may mean that an element or device is attached to or connected to another element or device. For example, the tracking device 104 may be plugged into the host device 102, may be socketed into the host device 102, may be soldered to the host device 102, and/or may be integrated into another component that is plugged into the host device 102, socketed into the host device 102, and/or soldered to the host device 102. In some examples of embedding, the tracking device 104 may be capable of being functional independent of the host device 102, may be separable (e.g., non-destructively separable) from the host device 102, may be removable from the host device 102, and/or may be capable of being plugged into and/or socketed into another device or devices. In some examples, the tracking device 104 may be pluggable and/or attachable for plugging into or attaching to the host device 102 and/or another device. In some examples, the host device 102 may host (e.g., include, house, and/or provide power for) the tracking device 104. In some examples, the host device 102 may include the host memory, and/or a host processor (not shown in FIG. 1). In some examples, the tracking device 104 may include memory and/or a processor (not shown in FIG. 1).

In some examples, the tracking device 104 may receive wireless information 108. In some examples, the tracking device 104 may include a transceiver (not shown in FIG. 1). The transceiver may include a transmitter to transmit wireless signals and/or may include a receiver to receive wireless signals. In some examples, the transceiver (e.g., receiver) may receive the wireless information 108 signaled from a remote device. A remote device may be a device that is external to the host device 102 and/or that communicates with the host device 102 via a communication link (e.g., network link). In some examples, the wireless information 108 may be received from a network (e.g., cellular network, wireless local area network (WLAN) (e.g., Wi-Fi), personal area network (PAN), and/or ad-hoc network, etc.).

The wireless information 108 may be a wireless signal that indicates information. For instance, the wireless information 108 may include user account information. In some examples, the tracking device may receive user account information wirelessly. An account may be information associated with an entity (e.g., user, ITDM, administrator, company, and/or corporation, etc.). In some examples, an account may be a user account (e.g., end-user account, employee account, customer account, etc.). In some examples, the user account information may correspond to, may be sent for, and/or may include information from an account. In some examples, user account information may include and/or indicate an identifier or identifiers (e.g., account number, user name, etc.). An identifier may be expressed as a number or numbers, character(s), text, digital code, etc. In some examples, user account information may include authentication information. For instance, the user account information may include a password, code, authorization number, etc., for performing authentication associated with an account. Authentication information may be expressed as a number or numbers, character(s), text, digital code, etc. In some examples, the identifier and/or authentication information may be hashed and/or encrypted.

In some examples, the tracking device 104 may send the user account information to the BIOS 106. For example, the tracking device 104 may send the user account information to the BIOS 106 via a connection (e.g., wire(s), internal bus, etc.) and/or a circuitry or circuitries of the host device 102. For instance, the tracking device 104 may send the user account information to a controller. The controller may deliver the user account information to the BIOS 106 from the tracking device 104. For instance, the host device 102 may include a controller in some examples. The controller may be circuitry (e.g., integrated circuitry, semiconductor circuitry, electronic component(s), etc.) to control an aspect or aspects of host device 102 operation. For example, the controller may include digital logic circuitry (e.g., a controller processor), transistors, memory, etc. In some examples, the controller may be separate from the tracking device 104. In some examples, the controller may be included in the tracking device 104.

In some examples, the controller may execute instructions and/or code to perform an operation or operations. For example, the controller may control an operating state or states of the host device 102. An operating state may be a degree of operation of an electronic device. Examples of operating states may include an active (e.g., "on") state, a standby state, and/or an inactive (e.g., "off") state. In some examples of an active state, all or most electronic device resources and/or components of the electronic device (e.g., host device 102) are active. In some examples of a standby state, some of the resources and/or components may be deactivated. For instance, display(s), camera(s), port(s), etc., may be deactivated in the standby state. In some examples of the inactive state, a selected resource or resources and/or component(s) may be active, while another resource or resources and/or component(s) may be deactivated. For instance, the tracking device 104, controller, and/or BIOS 106 may be active when the host device 102 is in an inactive state. In some examples, a host processor and/or host memory may be inactive when the host device 102 is in the inactive state. In some examples, the controller may be separate from (e.g., include different circuitry than) a host processor and/or host memory.

In some examples, the BIOS 106 may store the user account information 110 delivered from the tracking device 104. For example, the BIOS 106 may include BIOS memory, which the BIOS 106 may utilize to store the user account information 110.

In some examples, the host device 102 (e.g., BIOS 106) may utilize the user account information 110 to provision the host device 102. For instance, the host device 102 may utilize the user account information to register and/or activate the tracking device 104 and/or host device 102. In some examples, the host device 102 may send an activation request to a remote device based on the user account information. For instance, the host device 102 may send the user account information with an activation request to a server. In some examples, the host device 102 may receive an identifier (e.g., an identifier of the tracking device 104) in response to sending the activation request. Accordingly, the host device 102 and/or the tracking device 104 may be registered with a remote device based on the user account information 110.

Figure 2:
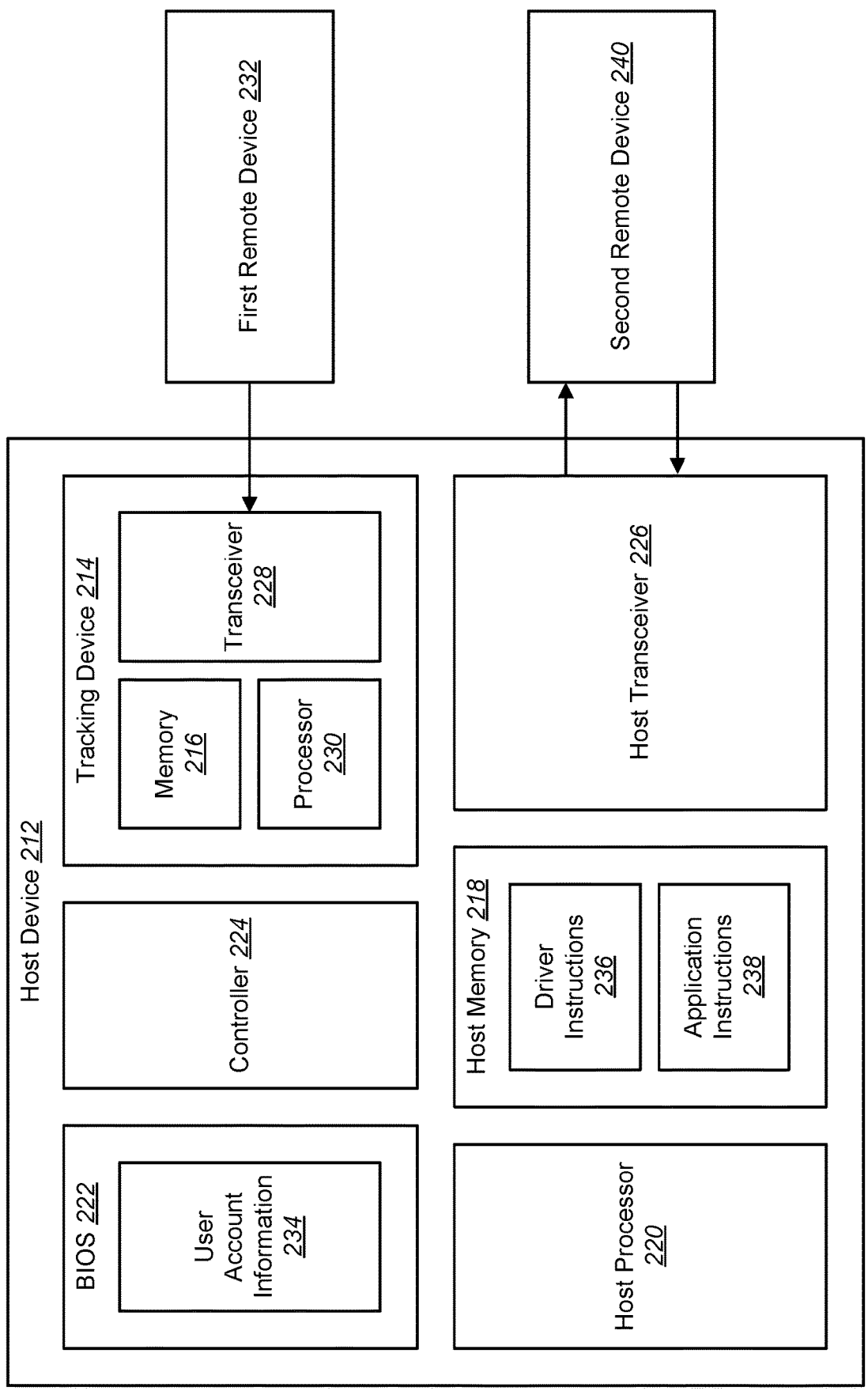
FIG. 2 is a block diagram of an example of a host device that may be utilized for provisioning using a BIOS.

FIG. 2 is a block diagram of an example of a host device 212 that may be utilized for provisioning using a BIOS 222. In some examples, the host device 212 may be an example of the host device 102 described in FIG. 1. Examples of the host device 212 may include laptop computers, tablet devices, game consoles, smartphones, etc. The host device 212 may include a tracking device 214, controller 224, BIOS 222, host processor 220, host memory 218, and/or host transceiver 226. The tracking device 214 may be an example of the tracking device 104 described in FIG. 1. In some examples, the tracking device 214 may be embedded in and/or coupled to the host device 212 as described in FIG. 1. In some examples, the host device 212 and/or tracking device 214 may perform one, some, or all of the functions, operations, elements, procedures, etc., described in one, some, or all of FIG. 1-4.

In some examples, the tracking device 214 may include memory 216 and/or a processor 230. The memory 216 may be separate from the host memory 218 in some examples. The processor 230 may be separate from the host processor 220 in some examples. In some examples, the memory 216 and the host memory 218 may be a single memory device for the host device 212 and the tracking device 214. In some examples, the processor 230 and the host processor 220 may be a single processor for the host device 212 and the tracking device 214. The processor 230 may be in electronic communication with the memory 216. For example, the processor 230 may execute instructions stored in the memory 216 to perform an operation or operations.

In some examples, the host processor 220 and/or processor 230 may respectively be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory. The host processor 220 may fetch, decode, and/or execute instructions stored in the host memory 218. The memory 216 and/or host memory 218 may respectively be any electronic, magnetic, optical, or other physical storage device(s) that contains or stores electronic information (e.g., instructions and/or data). Thus, memory may be, for example, Random Access Memory (RAM), Electrically Erasable Programmable Read-Only Memory (EEPROM), Dynamic Random Access Memory (DRAM), magnetoresistive random-access memory (MRAM), phase change RAM (PCRAM), memristor, flash memory, a storage device, and/or an optical disc, etc. In some examples, memory may be a non-transitory tangible machine-readable storage medium and/or a non-transitory tangible computer-readable medium, where the term "non-transitory" does not encompass transitory propagating signals. The host processor 220 may be in electronic communication with the host memory 218 and/or the processor 230 may be in electronic communication with the memory 216. In some examples, the processor 230 and/or memory 216 of the tracking device 214 may be combined with or separate from the host processor 220 (e.g., CPU) and/or host memory 218 of the host device 212.

In some examples, the tracking device 214 may include a transceiver 228. The transceiver 228 may include a transmitter to transmit wireless signals and/or may include a receiver to receive wireless signals. In some examples, the transceiver 228 may be an example of the transceiver 228 described in FIG. 1. In some examples, the transceiver 228 may include or be coupled to an antenna or antennas for transmitting and/or receiving signals.

In some examples, the tracking device 214 may receive user account information wirelessly. For instance, the transceiver 228 may receive the user account information wirelessly from a first remote device 232. The first remote device 232 may be an electronic device (e.g., computing device, server, etc.). The first remote device 232 may be external to the host device 212 and/or may communicate with (e.g., transmit to) the host device 212 using signaling (e.g., network signaling). In some examples, the first remote device 232 may be a System Center Configuration Manager (SCCM) server and/or a Manageability Integration Kit (MIK) server. In some examples, the user account information may be received using a protocol or protocols (e.g., Bluetooth, Wi-Fi, Long Term Evolution (LTE), 5G, etc.) via a network or networks (e.g., WLAN, cellular network, PAN, ad-hoc network, etc.). In some examples, the tracking device 214 may store the user account information in memory 216. In some examples, the host device 212 may be in an inactive state when the user account information is received. For instance, when in the inactive state, the host processor 220, the host memory 218, and/or the host transceiver 226 may be inactive. When in the inactive state, the BIOS 222, the controller 224, and/or the tracking device 214 may be active (which may allow the user account information to be received and/or stored in the BIOS 222, even when the host device 212 is in an inactive state). In some examples, the user account information may be received and/or stored in the BIOS 222 when the host device 212 is in an active state.

In some examples, other information may be received and/or stored in the BIOS 222 instead of or in addition to the user account information. For instance, beacon arrangement information may be received and/or stored in the BIOS 222. Beacon arrangement information may be information that specifies (e.g., instructs) how a beacon or beacons are to be transmitted and/or information that is to be transmitted in a beacon or beacons. In some examples, the host device 212 (e.g., transceiver 228 and/or host transceiver 226) may send a beacon or beacons in accordance with the received beacon arrangement information.

In some examples, the tracking device 214 may provide the user account information to the controller 224. The controller 224 may be an example of the controller described in FIG. 1. The controller 224 may deliver the user account information to the BIOS 222 from the tracking device 214.

In some examples, the user account information may be sent to the BIOS 222 using a different hardware path than the controller 224.

In some examples, the BIOS 222 may store the user account information 234 delivered from the tracking device 214. For instance, the BIOS 222 may be an example of the BIOS 106 described in FIG. 1 and/or the user account information 234 may be an example of the user account information 234 described in FIG. 1.

In some examples, the host processor 220 may retrieve and/or execute instructions from the host memory 218 to perform an operation or operations. For instance, the host memory 218 may include driver instructions 236 and/or application instructions 238. In some examples, the host processor 220 may run a driver. For instance, the host processor 220 may execute the driver instructions 236 to run a driver (e.g., instantiate and/or execute a driver). A driver may be a program to control a device. An example of a driver may be a communication device driver (e.g., Bluetooth driver). In some examples, the BIOS 222 may deliver the user account information 234 to the driver. For instance, the driver may store the delivered user account information in the host memory 218 (with the instance of the driver, for example).

In some examples, the host processor 220 may run an application. For instance, the host processor 220 may execute the application instructions 238 to run an application. In some examples, the application may manage the tracking device 214. For instance, the application may provide a function or functions for interfacing with and/or modifying the behavior of the tracking device 214. In some examples, the driver may deliver the user account information to the application. For instance, the application may store the delivered user account information in the host memory 218 (with the instance of the application, for example). In some examples, the driver may deliver the user account information to the application when the host device 212 is in an active state. For instance, the driver may deliver the user account information to the application in response to the host device 212 entering an active state. In some examples, the user account information may be unable to be delivered to the driver and/or to the application when the host device 212 is in an inactive state (due to the host processor 220, host memory 218, and/or an OS being inactive when the host device 212 is in the inactive state).

In some examples, the host transceiver 226 may send an activation request from the application to a second remote device 240. For instance, the application may initiate activation and/or registration procedures. In some examples, the host transceiver 226 may be different from the transceiver 228 utilized by the tracking device to receive the user account information wirelessly. For instance, the transceiver 228 and the host transceiver 226 may include different hardware (e.g., circuitry). In some examples, the transceiver 228 and the host transceiver 226 may use the same protocol or different protocols for communication. For instance, the transceiver 228 may utilize a PAN (e.g., Bluetooth) protocol to receive the user account information from the first remote device 232 and the host transceiver 226 may utilize a WLAN (e.g., Wi-Fi) protocol to send the activation request to the second remote device 240. The second remote device 240 may be an electronic device (e.g., computing device, server, etc.). The second remote device 240 may be external to the host device 212 and/or may communicate with (e.g., transmit to and/or receive from) the host device 212 using signaling (e.g., network signaling). For instance, the host transceiver 226 may send the activation request with the user account information from the application. The second remote device 240 may register (e.g., register to an ITDM account) the host device 212 and/or the tracking device 214 based on the user account information. For instance, the second remote device 240 may produce an identifier (e.g., unique identifier) for the tracking device 214 and/or host device 212 based on the activation request. The second remote device 240 may send the identifier to the host device 212 (e.g., host transceiver 226). For instance, the host transceiver 226 may receive the identifier of the tracking device in response to sending the activation request.

In some examples, the host device 212 may include additional components and/or some of the components described herein may be removed and/or modified without departing from the scope of this disclosure. In some examples, the host device 212 may include an input/output interface (not shown) through which the host device 212 may communicate with an external device or devices (not shown). The input/output interface may include hardware and/or machine-readable instructions to enable the host processor 220 to communicate with the external device or devices. The input/output interface may enable a wired or wireless connection to the external device or devices. In some examples, the input/output interface may further include a network interface card and/or may also include hardware and/or machine-readable instructions to enable the processor to communicate with various input and/or output devices, such as a keyboard, a mouse, a display, another apparatus, electronic device, computing device, etc., through which a user may input instructions and/or indications into the host device 212.

Figure 3:
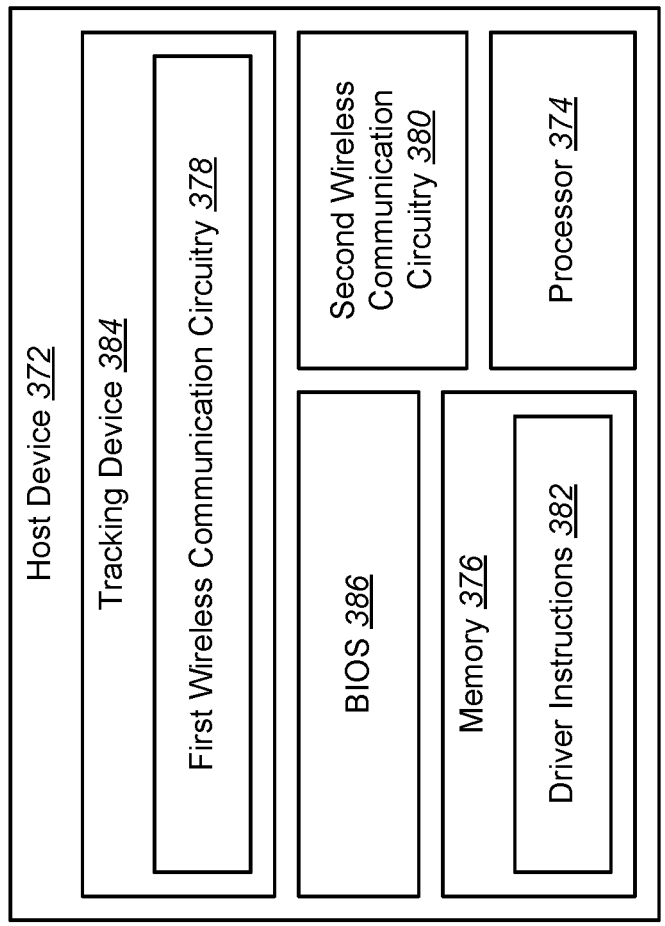
FIG. 3 is a block diagram of an example of a host device that may be utilized for beacon arrangement control via a BIOS.

FIG. 3 is a block diagram of an example of a host device 372 that may be utilized for beacon arrangement control via a BIOS 386. The host device 372 may be an example of the host device 102 and/or host device 212 described herein. Some examples of the host device 372 include smartphones, laptop computers, tablet devices, game consoles, mobile devices, etc. In some examples, the host device 372 may perform one, some, or all of the operations, aspects, elements, procedures, etc., described relative to the host device 102 and/or the host device 212 herein.

In some examples, the host device 372 may include memory 376, a processor 374, first wireless communication circuitry 378, second wireless communication circuitry 380, an integrated tracking device 384, and/or a BIOS 386. The memory 376, processor 374, first wireless communication circuitry 378, second wireless communication circuitry 380, integrated tracking device 384, and/or BIOS 386 may be examples of corresponding elements described in FIG. 1 and/or FIG. 2. The processor 374 may be in electronic communication with the memory 376.

In some examples, the host device 372 may include first wireless communication circuitry 378. The first wireless communication circuitry 378 may be circuitry to receive and/or transmit information. For example, the first wireless communication circuitry 378 may be utilized to transmit and/or receive information for the integrated tracking device 384. For instance, the first wireless communication circuitry 378 may receive and/or transmit information when the host device is in an active state or an inactive state. In some examples, the first wireless communication circuitry 378 may be a PAN (e.g., Bluetooth) transceiver. In some examples, the first wireless communication circuitry 378 may be included in the tracking device 384 and/or may be an example of the transceiver 228 described in FIG. 2. In some examples, the tracking device 384 may receive beacon arrangement information wirelessly. For instance, the tracking device 384 may receive beacon arrangement information as described in FIG. 1 and/or FIG. 2.

In some examples, the BIOS 386 may receive the beacon arrangement information from the tracking device 384. For instance, the BIOS 386 may receive the beacon arrangement information from the tracking device 384 via a controller of the host device 372 and/or another hardware path (e.g., wire, connection, circuitry, etc.). The beacon arrangement information may indicate an aspect or aspects of a beacon or beacons for the host device 372 to transmit.

In some examples, the memory 376 may include driver instructions 382. The processor 374 may execute the driver instructions 382 to instantiate and/or run a driver (e.g., communication driver, Bluetooth driver, etc.). In some examples, the BIOS 386 may send the beacon arrangement information to the driver.

In some examples, the host device 372 may include second wireless communication circuitry 380. The second wireless communication circuitry 380 may be circuitry to receive and/or transmit information. In some examples, the first wireless communication circuitry 378 and/or the second wireless communication circuitry 380 may be coupled to an antenna or antennas (e.g., the same antenna(s) or separate antenna(s)). In some examples, the second wireless communication circuitry 380 may be a cellular, WLAN (e.g., Wi-Fi), and/or PAN (e.g., Bluetooth) transceiver.

In some examples, the first wireless communication circuitry 378 and/or the second wireless communication circuitry 380 may receive the beacon arrangement information from the driver. The first wireless communication circuitry 378 and/or the second wireless communication circuitry 380 may send a beacon or beacons in accordance with the beacon arrangement information. For example, the first wireless communication circuitry 378 may send a beacon or beacons in accordance with the beacon arrangement information when the host device 372 is in an inactive state. In some examples, a beacon or beacons may indicate a status of the host device 372. Examples of status may include battery status (e.g., amount of battery charge), encryption status (e.g., whether encryption of the memory 376 and/or other storage is enabled and/or a proportion that is encrypted), etc. For instance, the host device 372 may include measuring circuitry (not shown in FIG. 3) to measure an amount of battery charge (e.g., percentage of battery charge). The host device 372 may send a beacon indicating the battery status that indicates the amount of battery charge.

Figure 4:
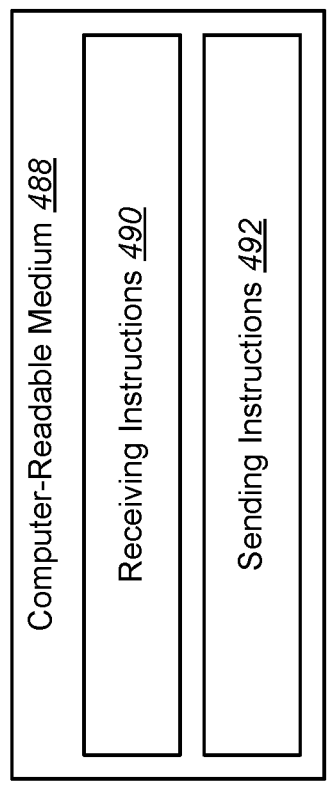
FIG. 4 is a block diagram illustrating an example of a computer-readable medium for provisioning.

FIG. 4 is a block diagram illustrating an example of a computer-readable medium 488 for provisioning. The computer-readable medium 488 may be a non-transitory, tangible computer-readable medium 488. The computer-readable medium 488 may be, for example, RAM, EEPROM, a storage device, an optical disc, and the like. In some examples, the computer-readable medium 488 may be volatile and/or non-volatile memory, such as DRAM, EEPROM, MRAM, PCRAM, memristor, flash memory, and the like. In some examples, the computer-readable medium 488 described in FIG. 4 may be an example of BIOS memory of a BIOS 106, BIOS 222, and/or BIOS 386 described in FIG. 1, FIG. 2, and/or FIG. 3. In some examples, code (e.g., data and/or executable code or instructions) of the computer-readable medium 488 may be transferred and/or loaded to memory or memories of an electronic device.

The computer-readable medium 488 may include code (e.g., data and/or executable code or instructions). For example, the computer-readable medium 488 may include receiving instructions 490 and/or sending instructions 492.

In some examples, the receiving instructions 490 may be instructions, when executed, that cause a BIOS of an electronic device to receive, via a controller, user account information from a wireless communication device that is integrated into the electronic device. For example, a BIOS may receive and/or store user account information as described in FIG. 1 and/or FIG. 2. In some examples, the receiving instructions 490, when executed, may cause the BIOS to receive the user account information when a processor of the electronic device is in an inactive state.

In some examples, the sending instructions 492 may be instructions, when executed, that cause a BIOS of an electronic device to send the user account information to a driver. For example, the sending instructions 492 may be executed to cause a BIOS to deliver the user account information to a driver as described in FIG. 1 and/or FIG. 2. In some examples, the sending instructions 492, when executed, may cause the BIOS to send the user account information to the driver in response to the controller detecting that the processor of the electronic device has entered an active state. For example, a controller may control and/or detect changes in the operating state of the electronic device. In a case that a processor (e.g., host processor) has entered an active state, the controller may trigger the BIOS to send the user account information to a driver.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, operations, functions, aspects, or elements of the examples described herein may be omitted or combined.

The invention claimed is:

1. A host device comprising:
    a tracking device to receive user account information wirelessly from an electronic device external to the host device;
    a controller in communication with the tracking device, wherein the controller is to receive the user account information from the tracking device; and
    a basic input/output system (BIOS), in communication with the controller, wherein the BIOS is to:
        store, in BIOS memory, the user account information from the controller; and
        provision at least one of the tracking device or the host device in accordance with the user account information wirelessly received from the electronic device and stored in BIOS memory.

2. The host device of claim 1, further comprising a processor to run a driver, wherein the BIOS is to deliver the user account information to the driver.

3. The host device of claim 2, wherein the processor is to run an application, wherein the driver is to deliver the user account information to the application.

4. The host device of claim 3, wherein the application is to manage the tracking device.

5. The host device of claim 3, wherein the host device is in an inactive state when the user account information is received, and wherein the driver is to deliver the user account information to the application in response to the host device entering an active state.

6. The host device of claim 3, further comprising a first transceiver to send an activation request from the application to a remote device.

7. The host device of claim 6, wherein the first transceiver is different from a second transceiver utilized by the tracking device to receive the user account information wirelessly.

8. The host device of claim 6, wherein the first transceiver is to receive an identifier of the tracking device in response to sending the activation request.

9. The host device of claim 1, further comprising a controller to deliver the user account information to the BIOS from the tracking device.

10. The host device of claim 1, wherein the BIOS is to provision without end-user interaction.

11. The host device of claim 1, wherein BIOS-based provisioning enables access to status information of the tracking device.

12. The host device of claim 11, wherein the BIOS-based provisioning is performed with an ad-hoc network formed between peer devices.

13. The host device of claim 1, wherein % BIOS-based provisioning is performed remotely, and an information technology decision maker provides fleet account information into the BIOS for use by the host device during an activation procedure.

14. The host device of claim 1, wherein the tracking device receives user account information wirelessly from a first remote device, the first remote device being different from the host device and tracking device, and the tracking device stores the user account information in memory.

15. A host device, comprising:
a tracking device to receive beacon arrangement information wirelessly from an electronic device external to the host device;
a controller in communication with the tracking device, wherein the controller is to receive the beacon arrangement information from the tracking device;
a basic input/output system (BIOS), in communication with the controller, wherein the BIOS is to:
receive, from the controller, the beacon arrangement information wirelessly received by the tracking device from the electronic device;
store, in BIOS memory, the beacon arrangement information received from the controller;
send the beacon arrangement information to a driver; and
wireless communication circuitry to receive the beacon arrangement information from the driver, wherein at least the wireless communication circuitry will be provisioned to send at least one beacon in accordance with the beacon arrangement information.

16. The host device of claim 15, wherein the wireless communication circuitry is to send a beacon in accordance with the beacon arrangement information when the host device is in an inactive state.

17. The host device of claim 16, wherein the beacon indicates a status of the host device.

18. A non-transitory tangible computer-readable medium comprising instructions when executed cause a basic input/output system (BIOS) of an electronic device to:
receive, via a controller, user account information from a wireless communication device that is integrated into the electronic device;
store, in BIOS memory, the user account information received from the controller; and
send the user account information to a driver, wherein the driver is to provision at least the wireless communication device in accordance with the user account information.

19. The non-transitory tangible computer-readable medium of claim 18, wherein the instructions when executed cause the BIOS to receive the user account information when a processor of the electronic device is in an inactive state.

20. The non-transitory tangible computer-readable medium of claim 19, wherein the instructions when executed cause the BIOS to send the user account information to the driver in response to the controller detecting that the processor of the electronic device has entered an active state.

* * * * *